United States Patent [19]

Hinz

[11] Patent Number: 4,570,575
[45] Date of Patent: Feb. 18, 1986

[54] COMBINED BIRD FEED CONTAINER AND BIRD FEEDER

[76] Inventor: Carl H. Hinz, Nonnenwaldweg 32, D-6229 Schlangenbad-Georgenborn, Fed. Rep. of Germany

[21] Appl. No.: 618,268

[22] Filed: Jun. 7, 1984

[30] Foreign Application Priority Data

Jun. 9, 1983 [DE] Fed. Rep. of Germany ....... 3320833

[51] Int. Cl.⁴ ............................................. A01K 39/00
[52] U.S. Cl. ................................. 119/52 R; 119/51 R
[58] Field of Search ...................... 119/51 R, 52 R, 53

[56] References Cited

U.S. PATENT DOCUMENTS

| 3,568,641 | 3/1971 | Kilham | 119/51 R |
| 4,102,308 | 7/1978 | Kilham | 119/52 R |
| 4,242,984 | 1/1981 | Smith | 119/52 R |
| 4,331,104 | 5/1982 | Clarke | 119/51 R |

Primary Examiner—Jay N. Eskovitz
Attorney, Agent, or Firm—Peter K. Kontler

[57] ABSTRACT

A combined bird feed container and bird feeder has an upright plastic housing which contains a supply of seeds or the like and the lower portion of which has a transverse horizontal tunnel open at both ends and surrounded by walls which, in turn, are fully surrounded by feed in the housing. The wall below the tunnel can be pierced or provided with a cutout to afford access to feed in the lower portion of the housing. A perch is driven through the lower portion of the housing. During shipment of the container, the perch is removably held in a longitudinally extending external groove of the housing. The upper portion of the housing is connected with a pivotable yoke which can be suspended on a tree branch or on a piece of cord.

15 Claims, 1 Drawing Figure

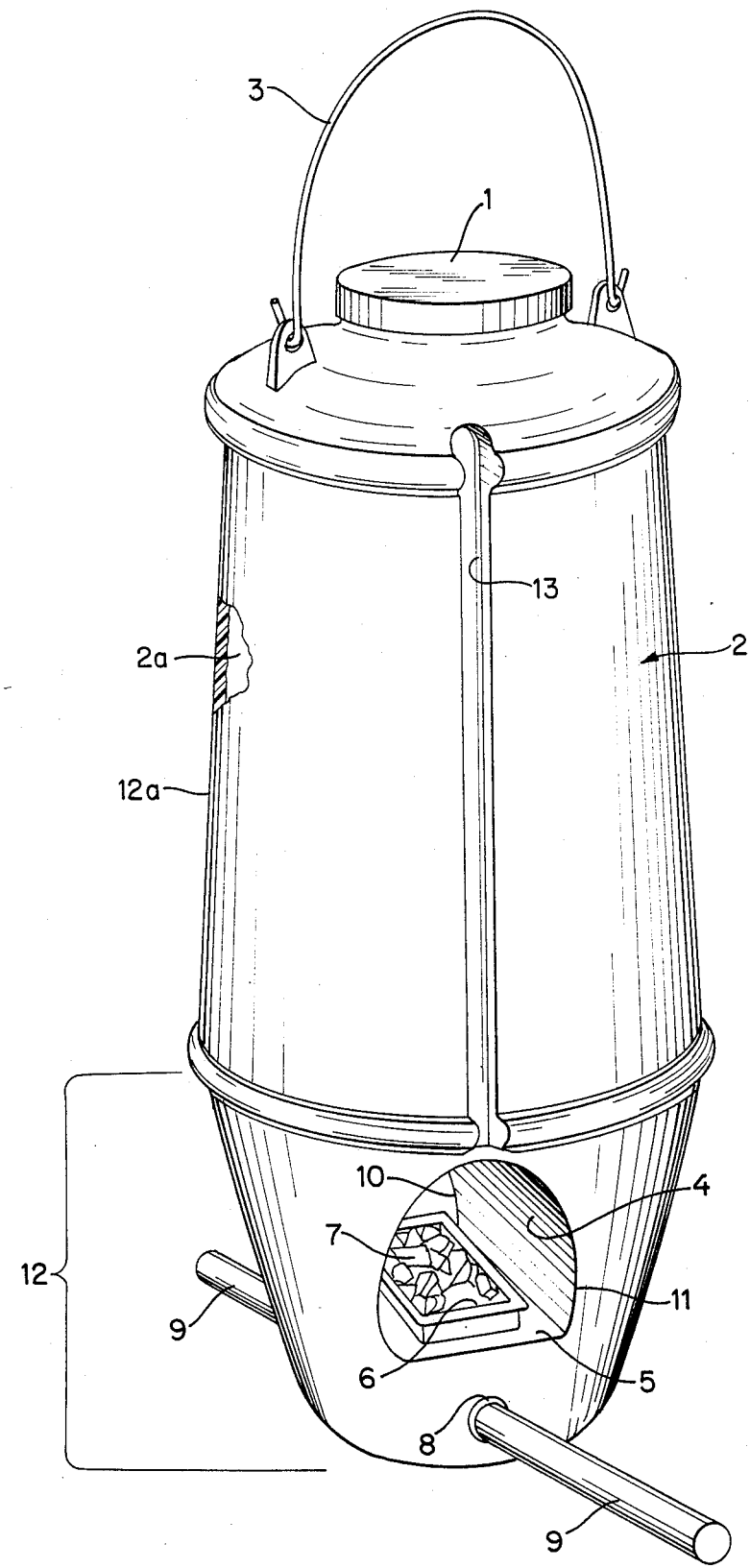

COMBINED BIRD FEED CONTAINER AND BIRD FEEDER

BACKGROUND OF THE INVENTION

The present invention relates to containers in general, and more particularly to improvements in containers for bird feed, such as seeds and the like.

A drawback of presently known bird feed containers is that they must be discarded upon consumption of their contents because they are not designed to serve any other useful purpose. Moreover, the appearance of presently known bird feed containers is not pleasing to the eye.

OBJECTS AND SUMMARY OF THE INVENTION

An object of the invention is to provide a novel and improved container which can be used for storage and shipment of bird feed as well as for other useful purposes.

Another object of the invention is to provide a novel and improved bird feeder.

A further object of the invention is to provide a refillable multiple-purpose bird feeder.

An additional object of the invention is to provide a refillable multiple-purpose bird feed container.

Still another object of the invention is to provide a bird feeder with novel and improved means for supporting one or more perches.

An ancillary object of the invention is to provide a novel and improved housing for a bird feeder.

A further object of the invention is to provide a novel and improved housing for a bird feed container.

Still another object of the invention is to provide a versatile and eye-pleasing bird feed container.

An additional object of the invention is to provide a versatile and eye-pleasing bird feeder.

An additional object of the invention is to provide a novel and improved bird feeder which invariably shields the feed from the elements but enables the birds to gain convenient access to the feed.

The invention is embodied in a combined bird feed container and bird feeder which comprises a hollow housing serving to store a supply of bird feed (e.g., seeds) and includes an upper portion and a lower portion. The lower portion has at least one transverse tunnel (e.g., a horizontal tunnel which has several open ends) and walls surrounding the turnnel and including a bottom wall which is readily penetrable to provide an opening affording access to the feed in the interior of the lower portion of the housing. The supply of feed in the lower portion is replenished by gravity flow from the upper portion of the housing.

The upper portion of the housing (or the lower portion) can be provided with a cover which is removable to expose an inlet for admission of feed into the interior of the housing.

The improved combined bird feed container and bird feeder is preferably further provided with means for facilitating suspension of the housing on the branch of a tree, on an arm at the upper end of a pole or post, or the like. Such suspension facilitating means can comprise a substantially U-shaped yoke whose end portions are articulately connected to the upper portion of the housing.

The bottom wall in the lower portion of the housing below the tunnel can include or constitute a panel which can be readily pierced or severed by a knife, by shears or by an analogous hand-held tool to provide the aforementioned opening which is accessible to the birds by way of the open end or open ends of the tunnel.

The combined bird feed container and bird feeder preferably further comprises at least one substantially rod-shaped perch which can be caused to penetrate transversely across the lower portion of the housing at a level below the tunnel to afford a seating opportunity for one or more birds. The housing is preferably provided with means for detachably supporting the perch or perches during storage and/or shipment of the container. Such supporting means can include an elongated groove which preferably extends longitudinally of the housing at its exterior and wherein the perch can be held by friction. The perch is preferably extractible from the lower portion of the housing, e.g., for reinsertion into the groove when the container is detached from a branch or the like.

The cross-sectional area of the lower portion of the housing preferably decreases in a direction away from the upper portion. Such lower portion can have a conical, particularly frustoconical or frustopyramidal, shape. This enables the birds to readily reach the opening in the tunnel.

The housing can be made of a suitable synthetic plastic material, e.g., from a deep drawn plastic material. The length of the upper portion of the housing can exceed the length of the lower portion, and the internal chamber of the housing preferably surrounds all of the walls which surround the tunnel. The bottom wall in the tunnel is preferably close to the bottom wall of the lower portion of the housing so as to ensure that the birds can completely remove the contents of the housing before the supply of feed is to be replenished or the container discarded.

The novel features which are considered as characteristic of the invention are set forth in particular in the appended claims. The improved container itself, however, both as to its construction and the mode of using the same, together with additional features and advantages thereof, will be best understood upon perusal of the following detailed description of certain specific embodiments with reference to the accompanying drawing.

BRIEF DESCRIPTION OF THE DRAWING

The single FIGURE of the drawing is a perspective view of a combined bird feed container and bird feeder which embodies the present invention.

DESCRIPTION OF THE PREFERRED EMBODIMENTS

The drawing shows a combined bird feed container and bird feeder which comprises an elongated housing 2 which is completely closed when purchased in a store and defines an internal chamber 2a which is then filled with seeds 7 and/or other sort of bird feed. The dimensions of the housing 2 need not appreciably deviate from those which are shown in the drawing, and the upper portion 12a of the housing is provided with a detachable cover or lid 1 through which the chamber 2a can be filled or refilled with feed. The means for facilitating suspension of the housing 2 on the branch of a tree, on a horizontal arm at the upper end of a pole or the like includes a U-shaped yoke 3 whose end portions are articulately connected to upstanding lugs provided on the top wall which carries the cover 1. If desired, the yoke 3 can be indirectly suspended on a branch or the like by resorting to a length of cord, wire or rope. The yoke 3 can be folded over the top wall of the housing 2 or is detached during storage and/or during shipment of the improved container. At such time, the chamber 2a is completely sealed and filled with feed 7. The yoke 3 further serves to facilitate manipulation of the container, i.e, suspension on or detachment from a support, withdrawal from a box or insertion into a box.

The lower portion 12 of the housing 2 is shorter than the upper portion 12a and resembles the frustum of a cone which tapers downwardly, i.e., in a direction away from the upper portion. If desired, the illustrated frustoconical portion 12 can be replaced with a pyramidal or frustopyramidal portion. A downwardly tapering lower portion is preferred at this time because it ensures more predictable gravitational flow of feed 7 from the upper portion 12a and also because it enables the bird or birds occupying a horizontal rod-like perch 9 to come closer to an opening 6 which affords access to feed. The opening 6 is provided in a bottom wall 5 forming part of a larger wall or constituting one of several walls surrounding a transversely extending horizontal tunnel 4 which is formed in the lower portion 12 at a level at least slightly above the perch 9. The tunnel 4 has two open ends 10 and 11; however, it is also possible to provide the lower portion 12 with a tunnel which is open at one end only, to provide a tunnel which has more than two open ends, or to provide the lower portion with two or more tunnels which are parallel to each other or make an oblique angle or a right angle. The bottom wall 5 below the lowermost part of the tunnel 4 can constitute a relatively thin panel which can be readily pierced and/or severed by a knife, by scissors or an analogous hand-held tool to provide the opening 6. In the illustrated embodiment, the opening 6 is surrounded by a rim and is exposed upon detachment from the upper edge of the rim of a closure (not shown) made of tinfoil or the like. All that counts is to ensure that the making or the exposure of the opening 6 does not require the exertion of a substantial effort so that such opening can be formed or exposed by a child, a housewife or a senior citizen. Moreover, the opening 6 should be sufficiently close to the bottom wall of the lower portion 12 so that the birds occupying the perch or crawling into the inlet 10 or 11 of the tunnel 4 can readily gather all of the feed which is confined in the chamber 2a and which tends to rise into the opening 6 as long as the supply of feed in the lower portion 12 is sufficient.

The perch 9 is forcibly introduced through the lower portion 12 of the housing so that it forms two aligned holes 8 (only one can be seen) and is held in the illustrated position by friction. This ensures that bird feed cannot escape through the holes 8. When the container is not in use as a bird feeder, the perch 9 is frictionally held by the surface bounding a longitudinlly extending groove 13 which is provided at the exterior of the housing 2, e.g., at the exterior of the upper portion 12a. When the container is to be put to use as a bird feeder, the perch 9 is extracted from the groove 13 and is forcibly introduced through the lower portion 12 to form the holes 8. The material around the holes 8 can be weakened by perforations or in another suitable way to facilitate predictable introduction of the perch 9 into and through the lower portion 12 of the housing 2.

If the yoke 3 is suspended on a string or rope, the housing 2 is likely to swing back and forth and/or to turn under the action of wind. It has been found that such movements of the housing do not deter the birds from visiting the perch 9 and eating the feed which is accessible in the tunnel 4 via opening 6. The wall or walls above the tunnel 4 shield the feed in the opening 6 from elements at all times. The housing 2 can be made of a suitable deep drawn synthetic plastic material and can be furnished in a single color or in several colors and with eye-pleasing designs thereon. Alternatively, at least a portion of the housing 2 can be made of a transparent or translucent material so as to allow for observation of the extent to which the chamber 2a is filled with feed. The eye-pleasing appearance of the housing 2 and of the entire container is enhanced still further when the device swings back and forth on a windy day and/or under the action of one or more birds occupying the perch 9.

If desired, the container can be furnished with two or more perches. The housing 2 is then formed with a corresponding number of grooves 13 for retention of perches prior to causing them to penetrate through the lower portion 12.

In order to facilitate the making of an opening 6 in the panel which constitutes or forms part of the bottom wall 5 below the tunnel 4, such panel can be scored or otherwise weakened to ensure that a slight pressure will suffice to allow for removal of a piece of the panel or for depression of a selected portion of the panel into the interior of the chamber 2a so as to expose the opening 6 and enable the birds to reach the feed 7. For example, a tab can be provided on a portion of the wall 5 which adheres to the remainder of such wall by thin ribs which are destroyed in response to exertion of a pull upon the tab so that the opening 6 becomes exposed.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A combined bird feed container and bird feeder, comprising an elongated hollow housing arranged to store a supply of feed and including an upper portion and a lower portion, said lower portion having at least one transverse tunnel and walls surrounding said tunnel and including a bottom wall which is readily penetrable to provide an opening affording access to the feed in the interior of the lower portion of said housing, said bottom wall having a rim surrounding said opening to protect the feed from elements and said upper portion including a cover which is removable to provide an inlet for admission of feed into the interior of the housing; and a rod-like perch, said housing having means for detachably supporting said perch and said supporting means including an elongated groove which extends substantially longitudinally of said housing and wherein the perch can be held by friction, said supporting means further including a substantially circumferentially extending projection provided on said housing and having a notch disposed in line with said groove and arranged to receive a portion of the perch when the latter is held in said groove.

2. The structure of claim 1, further comprising means for facilitating suspension of the housing on a tree branch or the like.

3. The structure of claim 2, wherein said suspension facilitating means includes a substantially U-shaped yoke having end portions articulately connected to the upper portion of said housing.

4. The structure of claim 1, wherein said tunnel is at least substantially horizontal.

5. The structure of claim 1, wherein said tunnel has several open ends.

6. The structure of claim 1, wherein said bottom wall includes a panel which can be severed by a knife or an analogous hand-held tool to provide said opening.

7. The structure of claim 1, further wherein said perch normally extends transversely of and through said lower portion.

8. The structure of claim 7, wherein said perch is extractible from said lower portion.

9. The structure of claim 7, wherein the location where said perch normally extends through said lower portion is disposed at a level below said tunnel.

10. The structure of claim 1, wherein said lower portion has a substantially conical shape.

11. The structure of claim 10, wherein said lower portion is a conical frustum which tapers downwardly in a direction away from said upper portion.

12. The structure of claim 1, wherein the cross-sectional area of said lower portion decreases in a direction away from said upper portion.

13. The structure of claim 1, wherein said housing consists of a synthetic plastic material.

14. The structure of claim 1, wherein the length of said upper portion exceeds the length of said lower portion.

15. The structure of claim 1, wherein said housing defines an internal chamber which surrounds said walls.

* * * * *